Figure 1:
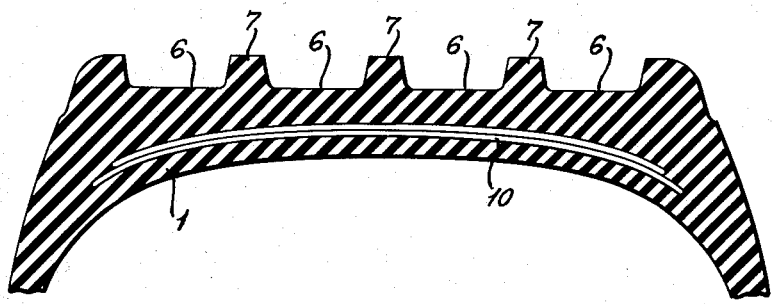
Figure 2:
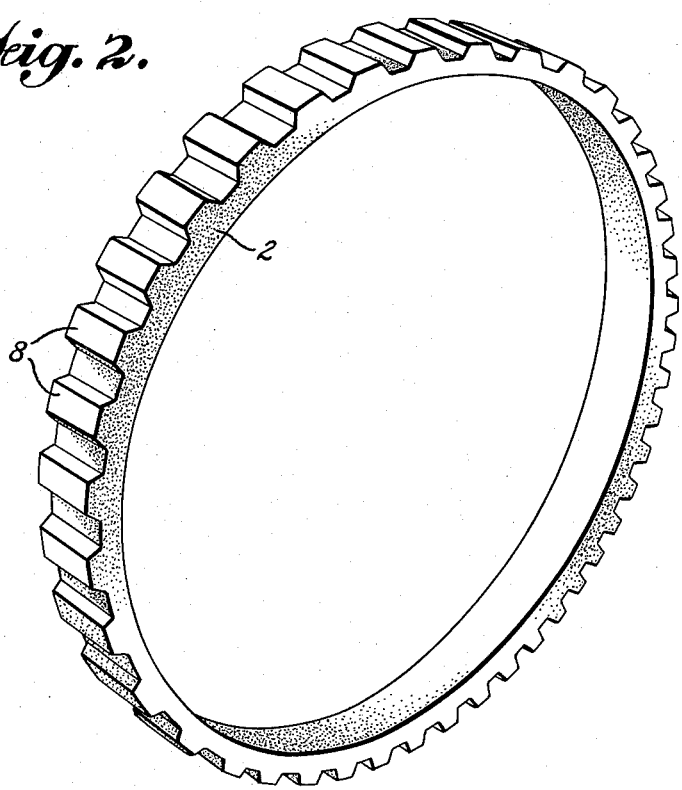

July 4, 1961            C. BARASSI            2,990,867

PNEUMATIC TIRE WITH SEPARATE TREAD RINGS

Filed July 11, 1960            3 Sheets-Sheet 1

INVENTOR
Carlo Barassi

BY Stevens, Davis, Miller & Mosher
ATTORNEYS

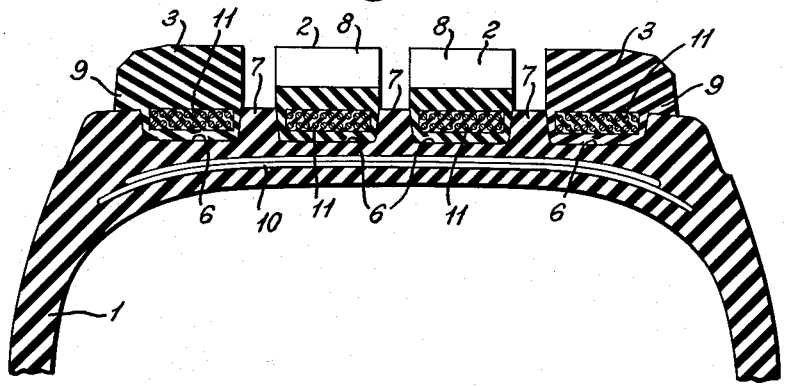
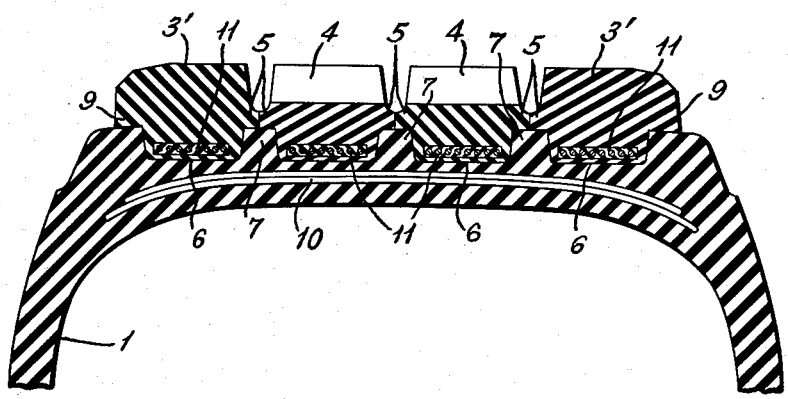

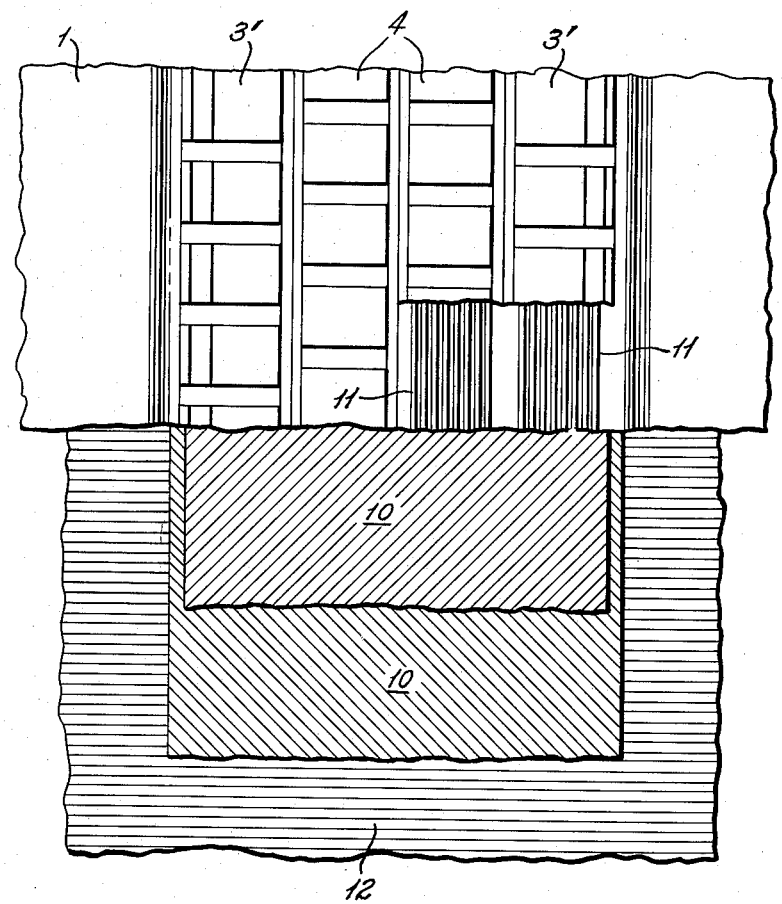

United States Patent Office 2,990,867
Patented July 4, 1961

2,990,867
PNEUMATIC TIRE WITH SEPARATE TREAD RINGS
Carlo Barassi, Milan, Italy, assignor to Pirelli S.p.A., Milan, Italy
Filed July 11, 1960, Ser. No. 42,015
Claims priority, application Italy June 4, 1957
2 Claims. (Cl. 152—176)

The present invention relates to a vehicle tire of the pneumatic type wherein the tread portion is removable from the carcass. More particularly, this invention relates to a tire of the above type wherein the removable tread portion is constituted by a plurality of separate tread rings.

This application is a continuation-in-part of copending application Serial No. 739,918, filed June 4, 1958, and now abandoned.

With regard to the more or less conventional type of pneumatic tire, it is well recognized, as a principal disadvantage, that the wear experienced by the tire is not uniform throughout; i.e., generally, the carcass of the tire is still in good serviceable condition even after the tread portion has worn out completely. One way of attempting to obviate this disadvantage is by a complicated and expensive operation of retreading, which consists in (1) removing the residual part of the tread, (2) situating a band of uncured rubber around the carcass and (3) thereafter vulcanizing the unit in a suitable mold.

Another solution to the above problem involves the construction of a pneumatic tire where the tread portion is separate from the carcass. The advantage of this construction is that the separate tread, in the form of a ring, is replaceable, such that when the tread portion has worn out, it is merely necessary to replace one ring with another. Also, another advantage of this particular construction is that the most appropriate tread pattern can be adopted according to the various conditions of the ground. This solution, however, creates an additional problem of holding the tread ring in place on the carcass; for this last-mentioned problem there have been various proposed expedients, for example, in the form of seats of various sizes and shapes on the carcass for locking the tread firmly in position. Also, it has been proposed to provide projections on the tire and corresponding cavities on the inner surface of the tread portion.

All of these proposals relative to the locking of the tread portion onto the carcass have resulted in no worthwhile or practical success. Despite all of the study and effort that has gone into these proposals, it has been difficult to avoid some form of movement between the tread and the carcass, which movement results in the generation of heat and in the rapid damage of both elements, and even in a creeping of the tread on the carcass.

One of the most promising solutions to the problem of preventing movement between the tread ring and the tire carcass, which forms the subject matter of United States Patent No. 2,874,742, consists in combination of a carcass whose cords have a radial or essentially radial direction and a tread portion provided with reinforcing elements made of substantially inextensible material and disposed in a prevailing longitudinal direction. Moreover, the outer surface of the carcass and the inner surface of the tread portion, where they come into contact with each other, are cylindrical and smooth; also, the tread ring must have an inner diameter equal to or slightly smaller than the outer diameter of the carcass (before inflation) in the area adapted to receive the tread. In such a construction, if the carcass were inflated devoid of the ring, it would assume, in the area adapted to receive the tread, a diameter larger than the inner diameter of the tread ring. However, since the tread ring, which is practically inextensible on account of the reinforcements contained therein, it is to be assembled on the carcass, the inflation pressure within the carcass secures the two parts together in a firm way and consequently the assembly behaves as if the tread portion were an integral part of the tire.

The present invention relates to a specific improvement over the latter described construction and allows for a more economical tread and easier manufacture.

The present invention provides, in a pneumatic tire of the type having a separate inextensible tread portion, a plurality of separate rings, at least two in number, which are disposed in parallel and spaced relationship in the central portion of the carcass and which are maintained in such spaced relationship by means of suitable ridges provided on the carcass. The ridges are spaced from one another in the lateral or transverse direction so as to form longitudinal grooves or seats for the tread rings. Each groove has a transverse cross-section whose outer width is at least equal to the (inner) width at the base of the groove.

The inextensible tread rings are provided with resistance elements consisting of cords having low elongation properties and made of a natural, artificial or synthetic textile material, or of metallic material. The cords have a longitudinal or prevailing longitudinal path; that is, they form angles of from about 0° to less than about 20° with respect to the midcircumferential plane through the tire. The resistance elements are situated in the inner part of each ring, namely, in the part in contact with the carcass. Each ring is provided with a plurality of resistance elements arranged in parallel relation and occupying an area extending transversely for practically the whole width of each ring.

The carcass is a radial carcass, namely, one in which the cords have a radial or practically radial path. In other words, these cords form an angle of about 0° (at any event not exceeding 10°) with respect to any plane passing through the axis of rotation of the tire. In this case, the layers of cords must be employed in even number, with one half of the layers being disposed in one direction and the other half being disposed in a direction symmetrical to the first half. These cords can be made of any suitable natural, artificial or synthetic material or of metallic material. Also, reinforcements for the beads can be provided in accordance with conventional methods.

An important feature of the present invention involves the provision of a breaker strip in the carcass in the region below the grooves for the tread rings. The breaker strip of the present invention is constituted by layers of cords which are parallel to one another in each layer and which are crossed with respect to the cords of an adjacent layer. Therefore, the cords of all layers are oriented in two directions symmetrical with respect to the mid-circumferential plane of the tire and are inclined with respect to said plane at angles which are the same as in case of conventional breaker strips, i.e. ranging between 35 degrees and 60 degrees.

The breaker strip is not anchored to the bead wires and, in fact, its width is such as not to extend beyond the maximum width of the cross-section of the tire.

The main purpose of this breaker strip is to increase the transversal rigidity of the tread, thus reducing the slip angle and improving the transversal stability of the tire. These features are very important for car and truck tires.

On the other hand, it has been discovered that a tire constructed in accordance with the present invention, with the exception that the breaker strip is omitted entirely, will result in a tire construction where the slip angle will be greatly increased, thus leading to inferior road-holding capabilities and greater tread wear.

The breaker strip of the present invention also serves

Whereas the present invention has been described in particular relation to the drawings illustrated herein, it should be apparent that other and further modifications, apart from those shown or suggested herein, might be made within the spirit and scope of this invention.

What is claimed is:

1. A pneumatic tire having a carcass of the radial type in which the cords of the carcass plies are disposed substantially radially of the tire, said carcass being provided with a plurality of longitudinal ridges on the outer periphery of said carcass, said ridges being spaced from one another in lateral direction so as to form longitudinal grooves, each groove having in transverse cross-section an outer width which is at least equal to the width at its base, a detachable tread comprising a plurality of separate tread rings receivable in the grooves of said carcass, substantially inextensible reinforcing elements imbedded in each tread ring in proximity of the inner periphery of each tread ring, said reinforcing elements being disposed in a prevailingly longitudinal direction and extending for practically the whole width of each ring, the neutral axes of the reinforcing elements of all of said rings being at the same distance from the axis of rotation of the tire, the inner diameter of each ring being smaller than the diameter of the carcass in the area adapted to receive said ring when said carcass is inflated devoid of said rings, and a breaker strip in the carcass in the zone below said grooves, said breaker strip being constituted by layers of cords, said cords being parallel to one another in each layer and being crossed with respect to the cords of an adjacent layer, the cords of all layers being inclined with respect to the midcircumferential plane of the tire at angles ranging between 35° and 60°.

2. A pneumatic tire as set forth in claim 1 in which each ring has lateral portions superposed on part of the upper face of each ridge, said superposed portions extending in a continuous way along the whole length of said rings and on said upper faces of the ridges, the lateral portions of adjacent rings abutting each other.

References Cited in the file of this patent

UNITED STATES PATENTS

| | | |
|---|---|---|
| 1,478,156 | Whitcomb | Dec. 18, 1923 |
| 2,254,329 | Stephens | Sept. 2, 1941 |
| 2,874,742 | Lugli | Feb. 24, 1959 |